(12) United States Patent
Nakanishi

(10) Patent No.: US 6,573,688 B2
(45) Date of Patent: Jun. 3, 2003

(54) BATTERY POWER SOURCE DEVICE

(75) Inventor: Toshiaki Nakanishi, Toyohashi (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/172,197

(22) Filed: Jun. 14, 2002

(65) Prior Publication Data
US 2003/0001544 A1 Jan. 2, 2003

(30) Foreign Application Priority Data
Jun. 15, 2001 (JP) ........................................ 2001-182375

(51) Int. Cl.[7] .............................................. H01M 10/46
(52) U.S. Cl. ....................................... 320/135; 320/141
(58) Field of Search .................................. 320/104, 124, 320/125, 127, 129, 135, 141, 145, 149, 166, 139

(56) References Cited

U.S. PATENT DOCUMENTS 6,225,788 B1  5/2001  Kouzu et al.

FOREIGN PATENT DOCUMENTS

| JP | 5-66250   | 3/1993  |
| JP | 5-297026  | 11/1993 |
| JP | 10-177926 | 6/1998  |
| JP | 11-111349 | 4/1999  |
| JP | 11-308701 | 11/1999 |

*Primary Examiner*—Edward H. Tso
(74) *Attorney, Agent, or Firm*—Merchant & Gould P.C.

(57) ABSTRACT

A battery power source device is provided, capable of detecting a charge/discharge current flowing through a secondary battery mounted on an electric vehicle, etc., at low cost, with high reliability, and with high precision. A voltage signal generated across a current detection resistor connected to an assembled battery in series is transmitted to a battery ECU via a transmission means. At the time of discharge from the assembled battery, the voltage signal is detected as a pulse signal using a discharge current detection unit, a first capacitor, and a pulse generation unit during discharge. At the time of discharge, the voltage signal is detected as a pulse signal using a charge current detection unit, a second capacitor, and a pulse generation unit during charge. Event counters calculate this pulse signal at the time of discharge and charge as a current flowing through the assembled battery.

7 Claims, 7 Drawing Sheets

BATTERY POWER SOURCE DEVICE

BACKGROUND OF THE INVENTION

1. Field of the Invention

The present invention relates to a technology for detecting a charge/discharge current flowing through a secondary battery mounted on an electrically-driven vehicle such as an electric vehicle (PEV) and a hybrid vehicle (HEV), an uninterruptible power supply system, a backup power source device, and the like.

2. Related Background Art

Recently, nickel-metal hydride (Ni—MH) batteries mainly have been used as a main power source for driving a motor in an electric vehicle (PEV) and a so-called hybrid vehicle (HEV) provided with an engine and a motor, because of their high energy density (i.e., capable of storing energy compactly) and high output density. In the PEV and HEV, an assembled battery made up of a combination of a plurality of single cells or unit cells is employed so as to supply a sufficient output to the motor.

As for HEVs, in a case where an output from an engine is larger than the power required for driving the vehicle, then the surplus power is used for driving a generator so as to charge a secondary battery. Conversely, in a case where an output from the engine is smaller, then the electrical power from the secondary battery is used for driving the motor so as to compensate a shortage of the power. In the latter case, the secondary battery is discharged. When mounting a secondary battery on a hybrid vehicle or the like, it is required to control such charge/discharge operations so as to maintain the appropriate operating conditions. To this end, it becomes necessary that a residual battery capacity (i.e., State of Charge (SOC)) is estimated and an SOC control is conducted so as to optimize the fuel efficiency of the vehicle.

One of parameters for estimating the SOC of a battery is a charge/discharge current in the battery. Therefore, in order to perform the SOC control securely, it is required to use a current sensor that can detect a charge/discharge current in the battery accurately.

Conventionally, as the current sensor used in the HEV or the like, an insulated type current sensor employing a Hall element has been known generally for the purpose of preventing electric leakage. For example, JP 5(1993)-297026A discloses a current sensor including a Hall element, a core provided with a winding, and an electronic circuit. However, this current sensor has the following problems:

(a) the core is provided with a winding, and many windings are required, which makes miniaturization of the current sensor difficult. Especially in the case of the HEV where a principal current is large and a ratio of a detected current at the side of the electronic circuit should be made relatively small, the number of turns of the wiring becomes large, which further makes the miniaturization difficult and leads to an increase in the cost. On the other hand, a wiring with a smaller wire diameter is used for the purpose of miniaturization, which would lead to a temperature rise and fraying of the wiring. Consequently, the reliability of the current sensor would deteriorate;

(b) an offset error in the detected current due to the temperature characteristics of the Hall element would occur;

(c) a circuit is required for not only at the side of receiving the detected current but also at the side of the current sensor, which doubles the number of the components such as a circuit board and therefore is uneconomical; and (d) when an electrical wiring to the current sensor has failed, a judgment cannot be made as to whether the situation applies to the case where a current does not flow through the wiring or the case where the wiring is broken.

To cope with the above problem (b), JP10(1998)-177926A discloses a current sensor including not a Hall element but a detection coil, an exciting coil, and a core. However, this current sensor does not solve the above problems (a) and (d).

Then, as an alternative for the insulated type current sensor that requires a core provided with a wiring, a current sensor in a shunt resistor method is known, which detects a current flowing through the shunt resistor as a voltage.

For example, JP11(1999)-308701A discloses a battery indicator for electrically-driven vehicles, including a shunt resistor type current sensor within it, and JP5(1993)-66250A discloses an electricity quantity totaling device that detects a charge/discharge electricity quantity of the secondary battery as a pulse using a current detection resistor (shunt resistor), totals this pulse with a counter to store the result, and indicates a residual battery capacity.

The battery indicator described in the above JP11(1999)-308701A is equipped with a shunt resistor within it, as illustrated in this publication. Generally, a driving output of the HEV or the like is large, and therefore a current flowing through the battery becomes large. With the increase in the current, the amount of heat generated in the shunt resistor increases. Therefore, a design to make the permissible loss acceptable makes the shunt resistor large and makes a wire diameter of an electric wiring to the shunt resistor also large. As a consequence, the battery indicator including the shunt resistor and the electric wiring within it becomes large, which would increase the cost and would cause deterioration in the fuel efficiency because of the increase in the weight of the vehicle.

In addition, since the detected current value is large, the resistance value of the shunt resistor should be rather small in order to detect such a large amount of current as a voltage suitable for processing it in a circuit. Therefore, without an expensive high-precision shunt resistor with superior temperature characteristics, an offset error would occur in the detected current.

Further, in the electrically-driven vehicles, a switching current of an inverter flows through the shunt resistor. This switching current has a large amount of high frequency component, which would become a noise source. Therefore, if the shunt resistor is arranged adjacent to a microcomputer and other electronic circuits, then there is the fear of generating a malfunction in the circuit due to the noise, and the reliability would deteriorate.

The electricity quantity totaling device described in the above JP5(1993)-66250A is mounted on mobile equipment such as a camera-integrated video, a mobile phone, a personal computer, and a word processor, and realizes a function of indicating a residual capacity of a secondary battery. Therefore, in contrast to the secondary batteries mounted on the HEV or the like, the detected current is small, and naturally the shunt resistor is included within the device together with other electronic components. Consequently, this publication does not address the problem in detecting a large amount of current flowing through a secondary battery mounted on the HEV or the like as stated above.

SUMMARY OF THE INVENTION

Therefore, with the foregoing in mind, it is an object of the present invention to provide a battery power source device provided with a system capable of detecting a charge/discharge current flowing through a secondary battery mounted on an electric vehicle, an uninterruptible power supply system, a backup power source device, and the like at low cost, with high reliability, and with high precision.

To fulfill the above-stated object, a battery power source device according to the present invention is a battery power source device to which electrical power is supplied from an assembled battery including a combination of a plurality of single cells or unit cells, each of which is a secondary battery, and includes: a current detection resistor connected to the assembled battery in series; transmission means for transmitting a voltage signal generated across the current detection resistor; and a control device separated from the assembled battery, the current detection resistor, and the transmission means. The control device includes: a discharge current detection unit that receives the voltage signal transmitted via the transmission means and outputs a current signal in proportion to a discharge current flowing through the current detection resistor at the time of discharge from the assembled battery; a first capacitor that totals the current signals output from the discharge current detection unit; a pulse generation unit during discharge that, when a voltage of the first capacitor increases to a first threshold value, reverses an output signal and makes the first capacitor discharge, and when the voltage of the first capacitor decreases to a second threshold value, reverses the output signal again to generate a pulse and stops the first capacitor discharging; a charge current detection unit that receives the voltage signal transmitted via the transmission means and outputs a current signal in proportion to a charge current flowing through the current detection resistor at the time of charge of the assembled battery; a second capacitor that totals current signals output from the charge current detection unit; a pulse generation unit during charge that, when a voltage of the second capacitor increases to a third threshold value, reverses an output signal and makes the second capacitor discharge, and when the voltage of the second capacitor decreases to a fourth threshold value, reverses the output signal again to generate a pulse and stops the second capacitor discharging; and a current detection unit that counts the number of pulses output from the pulse generation unit during discharge and the pulse generation unit during charge and calculates a current flowing through the assembled battery at the time of discharge and charge using the counted number of pulses.

With this configuration, since the current detection resistor through which a switching current of a inverter, which includes a high frequency component that might become a noise source, flows is provided outside of the control device, malfunction of a microcomputer and other electronic circuits mounted inside of the control device can be prevented, whereby the reliability of the system can be improved.

In the battery power source device according to the present invention, it is preferable that the current detection unit included in the control device counts in advance the number of pulses output from the pulse generation unit during discharge and the pulse generation unit during charge immediately after power-up of the battery power source device, the counted number of pulses in advance is subtracted from the number of pulses counted during operation of the battery power source device, and a current flowing through the assembled battery is calculated using a result of the subtraction.

In the battery power source device according to the present invention, it is preferable that each of the discharge current detection unit and the charge current detection unit further includes: a differential operation circuit having a first input terminal and a second input terminal; a first resistor having one end connected to the first input terminal of the differential operation circuit; a second resistor having one end connected to the second input terminal of the differential operation circuit; a first constant current circuit having an output end connected to the first input terminal of the differential operation circuit; a second constant circuit having an output end connected to the second input terminal of the differential operation circuit; a first current source that operates in accordance with an output signal from the differential operation circuit and functions so that a voltage level at the first input terminal of the differential operation circuit becomes equal to a voltage level at the second input terminal; and a second current source that operates in accordance with the output signal from the differential operation circuit, has a current mirror relationship with the first current source, and outputs a current signal in proportion to a current flowing through the current detection resistor to the outside. Here, the control device further includes: a first switch having one end connected to the other end of the first resistor and the other end electrically connected to one end of the current detection resistor via the transmission means; a second switch having one end connected to the other end of the second resistor and the other end electrically connected to the other end of the current detection resistor via the transmission means; and a third switch connected between the other ends of the first resistor and the second resistor.

In the above device, it is preferable that the control device further includes an offset correction unit that makes a correction to the current in accordance with a result obtained by subtracting a first counted number of pulses from a second counted number of pulses, where the first counted number of pulses is output from the pulse generation unit during discharge and the pulse generation unit during charge for a constant time period in a state where the first switch and the second switch are open and the third switch is closed during operation of the battery power source device, and the second counted number of pulses is output from the pulse generation unit during discharge and the pulse generation unit during charge in a state where the first switch and the second switch are closed and the third switch is opened during operation of the battery power source device. With this configuration, while the vehicle is in motion, even when components characteristics vary in accordance with a fluctuation in the environmental temperature, an offset error in the current can be eliminated at any time.

In the battery power source device according to the present invention, it is preferable that a side of the pulse generation unit during discharge and the pulse generation unit during charge and a side of the current detection unit are isolated electrically. With this configuration, the circuit at the side of the assembled battery and the circuit at the side of an auxiliary battery that supplies electrical power to the control device (ECU) can be isolated electrically (insulated), whereby malfunction due to electric leakage and noises can be prevented securely.

In the battery power source device according to the present invention, it is preferable that the current detection resistor includes at least: an alloy plate subjected to a resistance value trimming; a pair of metal plates on which both ends of the alloy plate are fixed and mounted and to which one end of the transmission means is fixed; and molded resin for sealing the alloy plate. With this configuration, a current detection resistor having a low resistance value and high precision can be obtained with a simple configuration.

In the battery power source device according to the present invention, it is preferable that the assembled battery is configured to be separated into a plurality of blocks, the battery power source device further includes a current control unit that controls a charge/discharge current with respect to the assembled battery; and the control device further includes a voltage detection unit that detects a battery voltage at each of the plurality of blocks; and a voltage comparison unit that compares battery voltages obtained from the voltage detection unit. Here, as a result of the comparison by the voltage comparison unit, if a difference in voltage is generated among the battery voltages at the plurality of blocks, the current control unit controls so as to decrease a current flowing through the current detection resistor. With this configuration, a variation in battery voltages among blocks can be reduced, and a battery performance as a whole of the assembled battery can be achieved sufficiently.

DETAILED DESCRIPTION OF THE INVENTION

The following describes an electrically-driven vehicle such as an electric vehicle and a hybrid vehicle, as one of preferred embodiments of the present, invention, with reference to the drawings.

Figure 1:
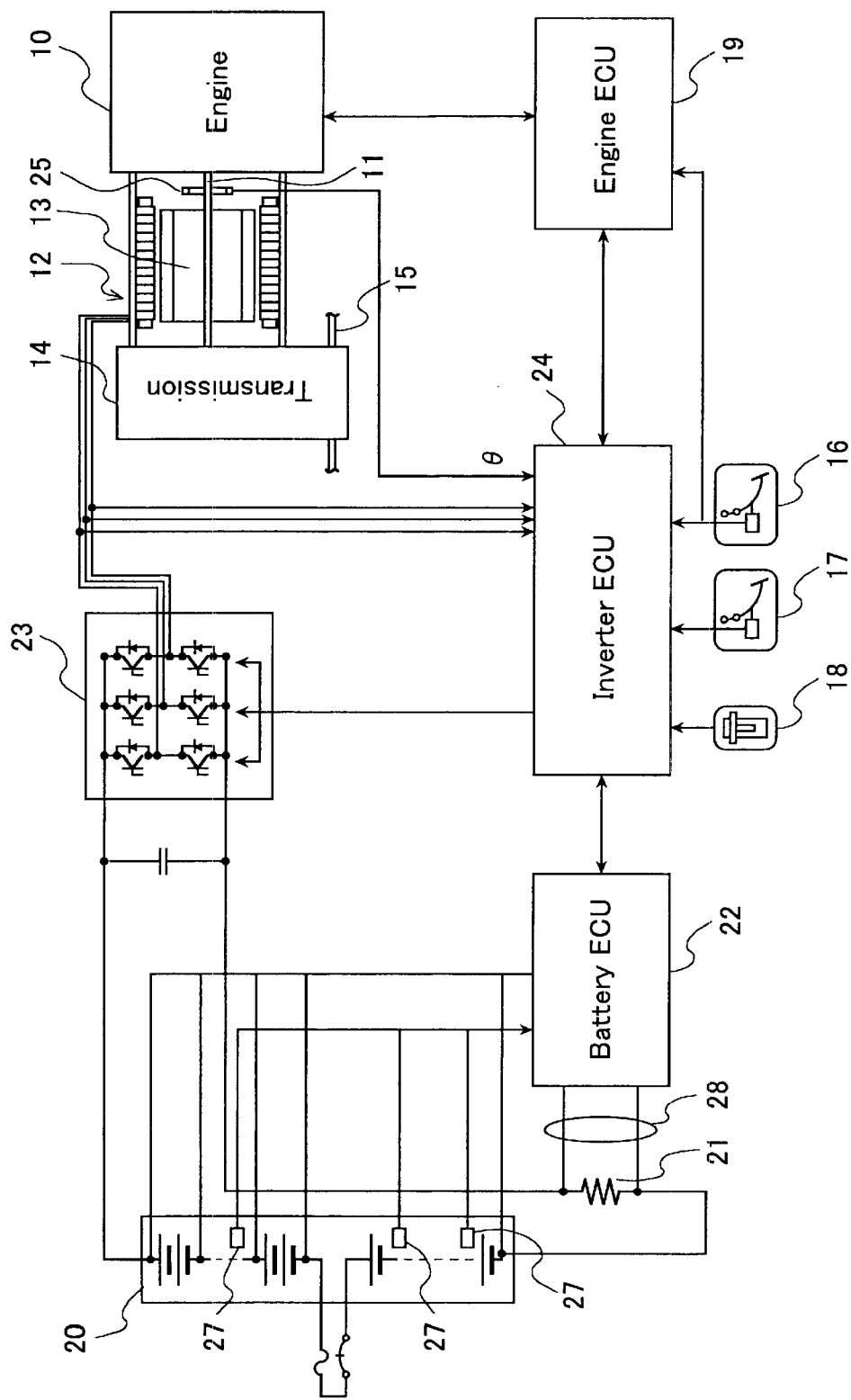
FIG. 1 shows a schematic configuration of a driving system of a hybrid vehicle (HEV) as an electrically-driven vehicle according to one embodiment of the present invention.

FIG. 1 shows a schematic configuration of a driving system of a hybrid vehicle (HEV) as an electrically-driven vehicle according to one embodiment of the present invention.

In FIG. 1, an output shaft 11 of an engine 11 is connected to a rotor 13 of a motor generator 12 and also is input into a transmission 14. The motor generator 12 functions as a three-phase AC generator and a three-phase AC motor. The transmission 14 reduces the rotation speed of the output shaft 11 of the engine 10 via an internal gear and the driving force is connected to a drive shaft 15 with driving wheels (not illustrated) connected at the ends via a differential. With this configuration, an output from the engine 10 or the motor generator 12 is transmitted to the driving wheels, whereby the vehicle is driven.

The output and the rpm of the engine 10 are controlled by an engine electronic control unit (ECU) 19, based on a manipulated variable of an accelerator pedal 16, environment conditions such as a circulating water temperature, an intake air temperature and an intake air pressure, engine information from a crank sensor and a knocking sensor, and an operation condition of the motor generator 12.

As illustrated in the drawing, an assembled battery 20 is made up of a plurality of single cells or unit cells that are connected in series, and is connected to the motor generator 12 via an inverter 23. In this embodiment, a secondary battery that makes up the assembled battery is a unit cell made of a nickel-metal hydride battery. The motor generator 12 is controlled by the inverter 23, and electrical power is transferred between the motor generator 12 and the assembled battery 20 via the inverter 23.

The inverter 23 is controlled by an inverter ECU 24. This control is conducted based on operation condition information of the engine 10 from the engine ECU 19, a manipulated variable of the accelerator pedal 16, a manipulated variable of a brake pedal 17, a shift range designated by a shift lever 18, information on the assembled battery 20 such as an accumulation state of electricity (residual battery capacity: SOC) and generation of a failure from a battery ECU 22 (a control device of the assembled battery 20), a turning angle θ of the output shaft 11 of the engine 10 detected by a resolver 25, currents Iu, Iv, and Iw in U-phase, V-phase, and W-phase of the motor generator 12, and the like.

The inverter ECU 24 outputs a signal for controlling each of the transistors that make up the inverter 23, based on these information. Then, the inverter ECU 24 controls a field current of the motor generator 12 based on the revolving speed at that moment, and determines whether the motor generator 12 should function as a generator or as a motor. When the motor generator 12 functions as the generator, the charge is conducted to the assembled battery 20, whereas when the motor generator 12 functions as the motor and consumes electrical power, electrical power is discharged from the assembled battery 20.

For example, if the battery ECU 22 detects a decrease in the SOC of the assembled battery 20, then the battery ECU 22 makes the motor generator 12 generate electrical power via the inverter ECU 24 and the inverter 23 by using a part of a torque generated by the engine 10, and then charge is conducted to the assembled battery 20. Conversely, if the battery ECU 22 detects increase in the SOC of the assembled battery 20, then the battery ECU 22 performs a control so as to suppress an output from the engine 10 via the engine ECU 19, make the motor generator 12 function as a motor via the inverter 23, and use the thus generated torque for driving the vehicle.

Alternatively, during a braking operation of the vehicle, the inverter ECU 24 makes the motor generator 12 function as a generator, and charges the assembled battery 20 using thus generated electrical power.

Since it is difficult to anticipate when the braking operation of the electrically-driven vehicle is conducted, it is preferable that the assembled battery 20 should have room enough for accepting the electrical power generated from the braking operation. On the other hand, when an output from the engine 10 is not enough for obtaining the acceleration desired by a driver, the SOC of the assembled battery 20 should remain to some extent so as to make the motor generator 12 function as a motor. To satisfy these conditions, the SOC of the assembled battery 20 is controlled so as to keep a middle state of the battery capacity.

In the case of the HEV where electrical power is generated by the output from the engine 10 so as to charge the battery, the SOC of the assembled battery 20 is controlled adequately, whereby regenerative electric power during the braking operation is collected sufficiently to increase an energy efficiency so that an acceleration desired by a driver can be achieved at the time of acceleration.

In this way, the process for detecting the SOC of the assembled battery 20 accurately and controlling the SOC adequately is important for a vehicle whose power source is a battery like the HEV Therefore, a battery voltage, a charge/discharge current, and a battery temperature are input into the battery ECU 22 as information on the state of the cells that make up the assembled battery 20, so that the SOC and failures of the assembled battery 20 are calculated and estimated. As for the battery voltage, the assembled battery 20 is separated into a plurality of blocks, and a battery voltage is detected for each block. As for the battery temperature, since the battery temperature varies among the detected positions, temperature sensors 27 provided at a plurality of positions are used for detecting temperatures.

In addition, in order to detect a charge/discharge current of the assembled battery 20, a current detection resistor 21 connected to the assembled battery 20 in series is provided. A very small voltage across the current detection resistor 21 generated at the time of charge or discharge of the assembled battery 20 is input into the battery ECU 22 via a wiring harness 28 functioning as a transmission means, and then a current value is calculated.

Next, the configuration and operation for calculating the current value by the battery ECU 22 will be explained in the following, with reference to FIG. 2.

Figure 2:
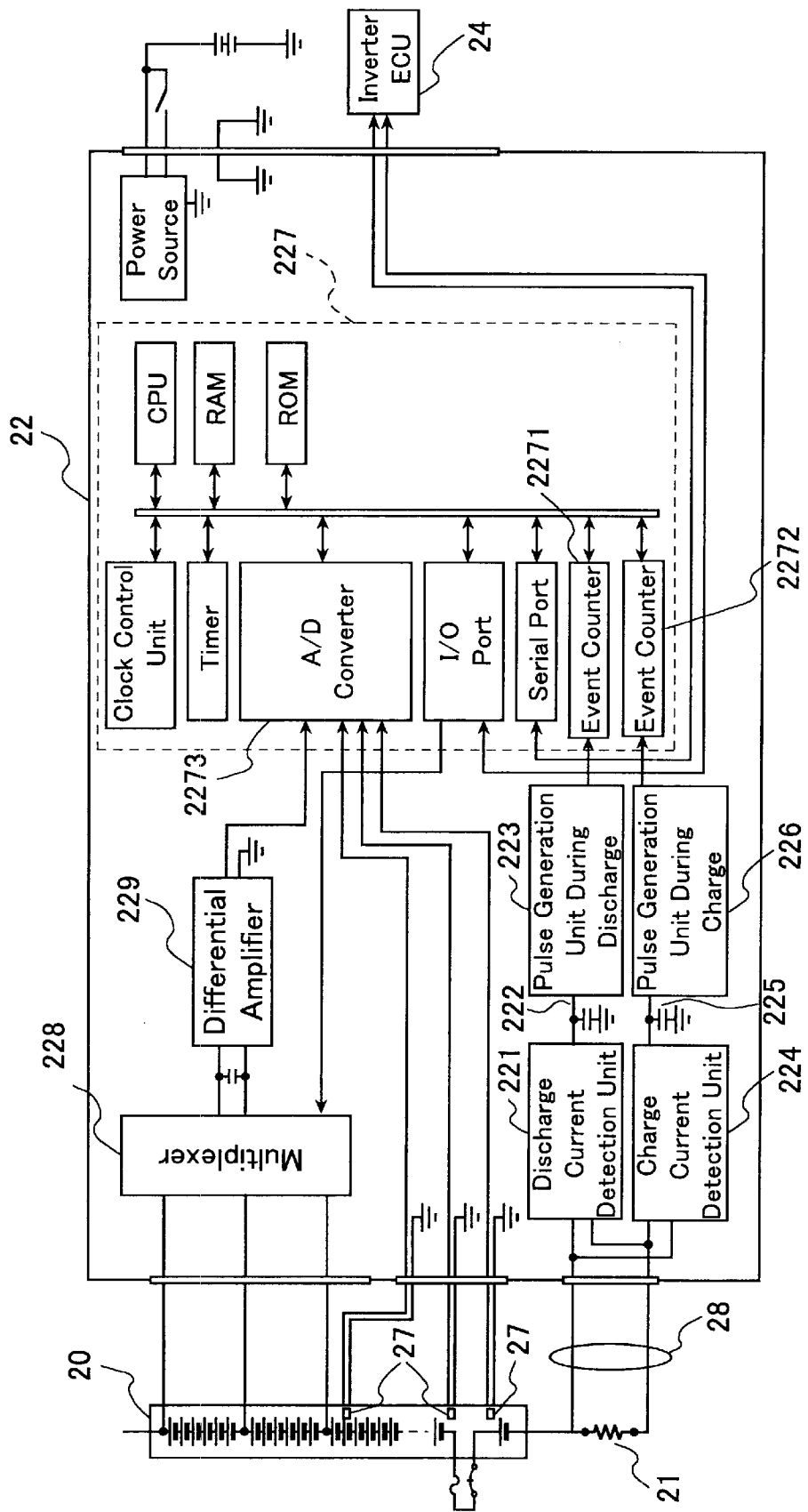
FIG. 2 is a block diagram showing an internal configuration and a peripheral configuration of a battery ECU 22.

FIG. 2 is a block diagram showing an internal configuration and a peripheral configuration of the battery ECU 22.

In FIG. 2, a very small voltage generated across the current detection resistor 21, which has been input into the battery ECU 22 via the transmission means 28, is supplied to a discharge current detection unit 221 and a charge current detection unit 224.

First, at the time of discharge from the assembled battery 20, the discharge current detection unit 221 outputs a current signal in proportion to a discharge current flowing through the current detection resistor 21 to a first capacitor 222, and then the first capacitor 222 accumulates the current signal. A pulse generation unit during discharge 223, into which a voltage of the first capacitor 222 is input, functions as follows. That is, when the voltage of the first capacitor 222 increases to a first threshold value (VT1), then the pulse generation unit during discharge 223 reverses an output signal, and at the same time makes the first capacitor 222 discharge. When the voltage of the first capacitor 222 decreases to a second threshold value (VT2), then the pulse generation unit during discharge 223 reverses the output signal again to generate a pulse, and at the same time stops the first capacitor 222 discharging. In this way, the pulse generation unit during discharge 223 generates a pulse proportional in number to the amount of the discharge current from the assembled battery 20.

The current detection unit is configured by hardware and software within a microcomputer 227. The pulse output from the pulse generation unit during discharge 223 is input into an event counter 2271 (current detection unit) within the microcomputer 227. The event counter 2271 is set so as to count a rising edge of the input pulse, and a counted number of the event counter 2271 is confirmed by the software at every one of a constant time period. After confirmation, the counted number is cleared. Since the number of the pulses generated during a constant time period is proportional to a current value, the confirmed counted number of the pulses can be converted into a discharge current value according to a numerical formula. Hence, the discharge current value can be detected. Moreover, by totaling the results obtained by multiplying this discharge current value and the time period together, or by continuing to total the number of pulses, a total current value of the battery also can be calculated.

Next, at the time of charge of the assembled battery 20, the charge current detection unit 224 outputs a current signal in proportion to a charge current flowing through the current detection resistor 21 to a second capacitor 225, and then the second capacitor 225 accumulates the current signal. A pulse generation unit during charge 226, into which a voltage of the second capacitor 225 is input, functions as follows. That is, when the voltage of the second capacitor 225 increases to a third threshold value (VT3), then the pulse generation unit during charge 226 reverses an output signal, and at the same time makes the second capacitor 225 discharge. When the voltage of the second capacitor 225 decreases to a fourth threshold value (VT4), then the pulse generation unit during charge 226 reverses the output signal again to generate a pulse, and at the same time stops the second capacitor 225 from discharging. In this way, the pulse generation unit during charge 226 generates a pulse proportional in number to the amount of the charge current of the assembled battery 20. The pulse output from the pulse generation unit during charge 226 is input into an event counter 2272 (current detection unit) within the microcomputer 227, where the number of pulses is counted to calculate a current value during charge.

Here, a battery voltage of the assembled battery 20 is input into a multiplexer 228 for each block. A voltage value of each block is selected in a time series and an A/D converter 2273 obtains the voltage value as a voltage data via a differential amplifier 229. The voltage data obtained for each block are subjected to a comparative operation by the microcomputer 227. As a result of the comparison, if voltage data for each block differ from one another, then the microcomputer 227 in the battery ECU 22 issues an instruction to the inverter ECU 224 so as to control a current flowing through the current detection resistor 21 to be decreased. Thereby, a variation in battery voltages among blocks can be reduced, and a battery performance as a whole of the assembled battery can be achieved sufficiently.

Next, among the configuration shown in FIG. 2, specific examples of a portion for generating pulses proportional in number to the discharge and charge currents will be described in the following.

Figure 3:
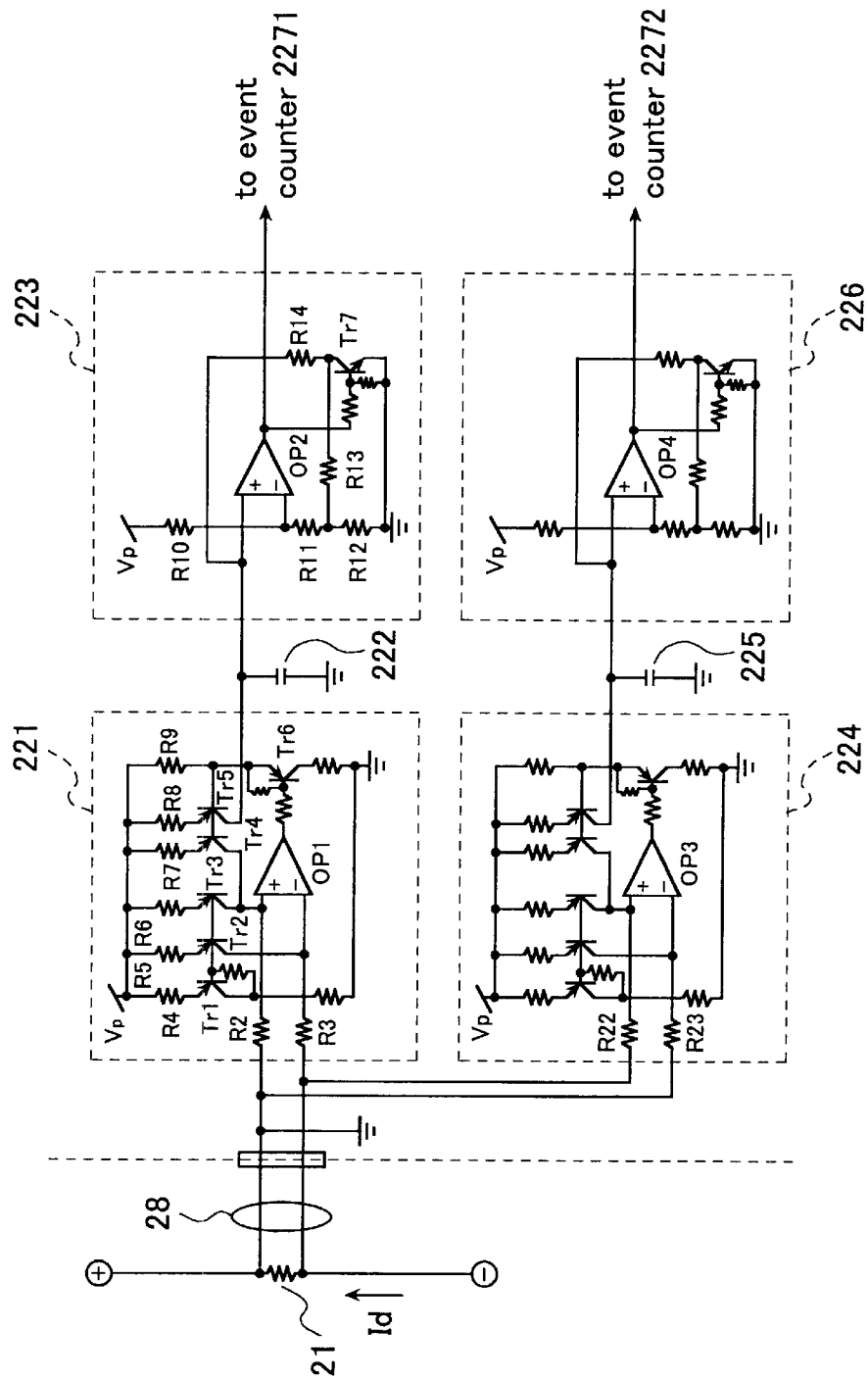
FIG. 3 is a circuit diagram showing one configuration example of a discharge current detection unit 221, a pulse generation unit during discharge 223, a charge current detection unit 224, and a pulse generation unit during charge 226 shown in FIG. 2.

FIG. 3 is a circuit diagram showing one configuration example of the discharge current detection unit 221, the pulse generation unit during discharge 223, the charge current detection unit 224, and the pulse generation unit during charge 226. Note here that, since the configuration and operation are similar between discharge and charge operations, the following only describes the case where a current flowing through the current detection resistor 21 is in a direction of discharge.

In FIG. 3, a resistor R2 is connected to one end of the current detection resistor 21 via the transmission means 28 at one end and is connected to a non-reverse input terminal (+) of an operational amplifier OP1 at the other end. A resistor R3 is connected to the other end of the current detection resistor 21 via the transmission means 28 at one end and is connected to a reverse input terminal (−) of the operational amplifier OP1 at the other end. These resistors R2 and R3 are provided for conducting an offset adjustment and realizing an input impedance matching for the operational amplifier OP1, and have a resistance value of 100 Ω, respectively. Collector currents in transistors Tr2 and Tr3 flow through the R2 and R3 beforehand, where the transistors Tr2 and Tr3 have a current mirror relationship with a transistor Tr1 forming a reference current.

When the assembled battery 20 discharges with a current Id, then a potential difference (In FIG. 3, upper side denotes positive) is generated across the current detection resistor 21. Here, a resistance value of the current detection resistor 21 is set to be very small, for example, to 1 mΩ in order to reduce heat generation to a minimum. When a potential difference is generated across the current detection resistor 21, a voltage level at the reverse input terminal of the operational amplifier OP1 becomes larger than that at the non-reverse input terminal thereof and an output voltage from the operational amplifier OP1 becomes a level closer to the ground potential. Thus, a transistor Tr6 is turned ON and an emitter voltage of the transistor Tr6 decreases. As a result, transistors Tr4 and Tr5, whose bases are connected to the emitter of the transistor Tr6, are turned ON.

When the transistor Tr4 is turned ON, a current flows through the resistor R2, so that a voltage at the non-reverse input terminal of the operational amplifier OP1 is increased. Here, the current flowing through the resistor R2 is determined by a ratio between resistance values of the resistor R2 and the current detection resistor 21. Since the ratio between the resistance values of the current detection resistor 21 (resistance value: 1 mΩ) and the resistor R2 (resistance value: 100 Ω) is $\frac{1}{100000}$, assuming that the discharge current Id is 30A, for example, if the collector current in the transistor Tr4 is 300 μA, a potential difference between the non-reverse input terminal and the reverse input terminal of the operational amplifier OP1 becomes zero, so that the operational amplifier OP1 becomes a balancing state.

Here, resistance values of resistors R7 and R8, which are connected to emitters of the transistors Tr4 and Tr5, respectively, are set to be the same, and therefore the first capacitor 222 is charged by the transistor Tr5 with the same current value as the collector current in the transistor Tr4, i.e., of 300 μA. When the voltage of the first capacitor 222 increases to the voltage VT1 set by using resistors R10, R11, and R12 (the first threshold value: VT1=Vp·(R11+R12)/(R10+R11+R12)), the output voltage from an operational amplifier OP2 becomes a level closer to a power source voltage Vp ("H" level), so that a transistor Tr7 is turned ON. When the transistor Tr7 is turned ON, the charged voltage of the first capacitor 222 is discharged and decreased through a resistor R14 and the transistor Tr7. When the charged voltage decreases to the voltage VT2 set by using resistors R10, R11, R12, and R13 (the second threshold value: VT2=Vp·(R11+(R12//R13)/(R10+R11+(R12//R13)), the output voltage from the operational amplifier OP2 is reversed and becomes a level closer to the ground potential ("L" level), so that the transistor Tr7 is turned OFF and the discharge of the first capacitor 222 stops.

If the assembled battery 20 continues to discharge in this manner, the voltage of the first capacitor 222 varies like a sawtooth shape, where one pulse output from the operational amplifier OP2 serves as a unit for a discharged quantity of electricity and a current value becomes a value corresponding to the number of pulses.

Here, since a very small change in voltage of the current detection resistor 21 is input into the operational amplifier OP1 in the discharge current detection unit 221 and an operational amplifier OP3 in the charge current detection unit 224, a variation characteristic in the input offset voltage of the operational amplifiers gives an influence on the accuracy of the current value. However, according to this embodiment, the input offset voltages of the operational amplifiers OP1 and OP3 are corrected, whereby a current value can be calculated with high precision. The following describes this mechanism.

When the assembled battery 20 does not charge and discharge, for example, immediately after power-up of the vehicle, the microcomputer 227 obtains in advance the number of pulses output from the operation amplifier OP2 in the pulse generation unit during discharge 223 or an operational amplifier OP4 in the pulse generation unit during charge 226 during a constant time period, via the event counter 2271 and 2272. The thus obtained number of pulses is subtracted from the number of pulses during the constant time period when charge/discharge is conducted while the vehicle is in motion, whereby an offset error can be eliminated from the current value.

Figure 4:
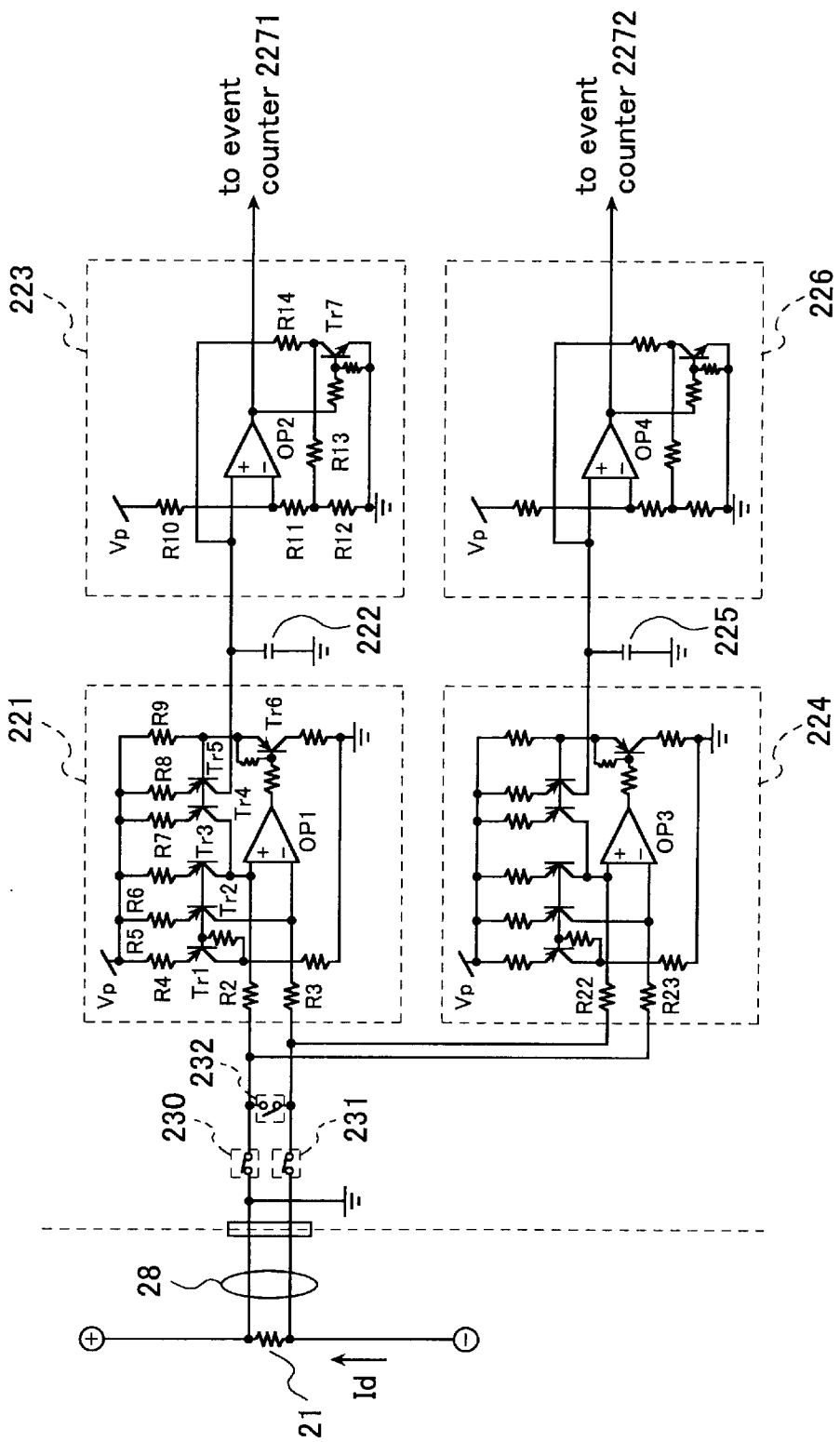
FIG. 4 is a circuit diagram showing a modified example of the configuration shown in FIG. 3.

Furthermore, the configuration shown in FIG. 4 can eliminate an offset error from the current value.

In the battery ECU 22 shown in FIG. 4, a first switch 230, a second switch 231 and a third switch 232 are provided. The first switch 230 has one end connected to a common connection between the resistor R2 and a resistor R23 in the charge current detection unit 224 and the other end connected to one end of the current detection resistor 21 via the transmission means 28, the second switch 231 has one end connected to a common connection between the resistor R3 and a resistor R22 in the charge current detection unit 224 and the other end connected to the other end of the current detection resistor 21 via the transmission means 28, and the third switch 232 is connected between the common connection of the resistors R2 and R23 and the common connection of the resistors R3 and R22.

When the vehicle is in motion, under the control of the microcomputer 227, the following procedure is conducted. First, the first switch 230 and the second switch 231 are turned OFF, and the third switch 232 is turned ON. In this state, a counted value of the pulses output from the event counters 2271 and 2272 at every one of a constant time period is stored. Next, thus stored counted value of the pulses is subtracted from a counted value of pulses output from the event counters 2271 and 2272 when the first switch 230 and the second switch 231 are turned ON and the third switch 232 is turned OFF. Thereby, while the vehicle is in motion, even when the components characteristics vary in accordance with a fluctuation in the environmental temperature, an offset error in the current value can be eliminated at any time.

Figure 5:
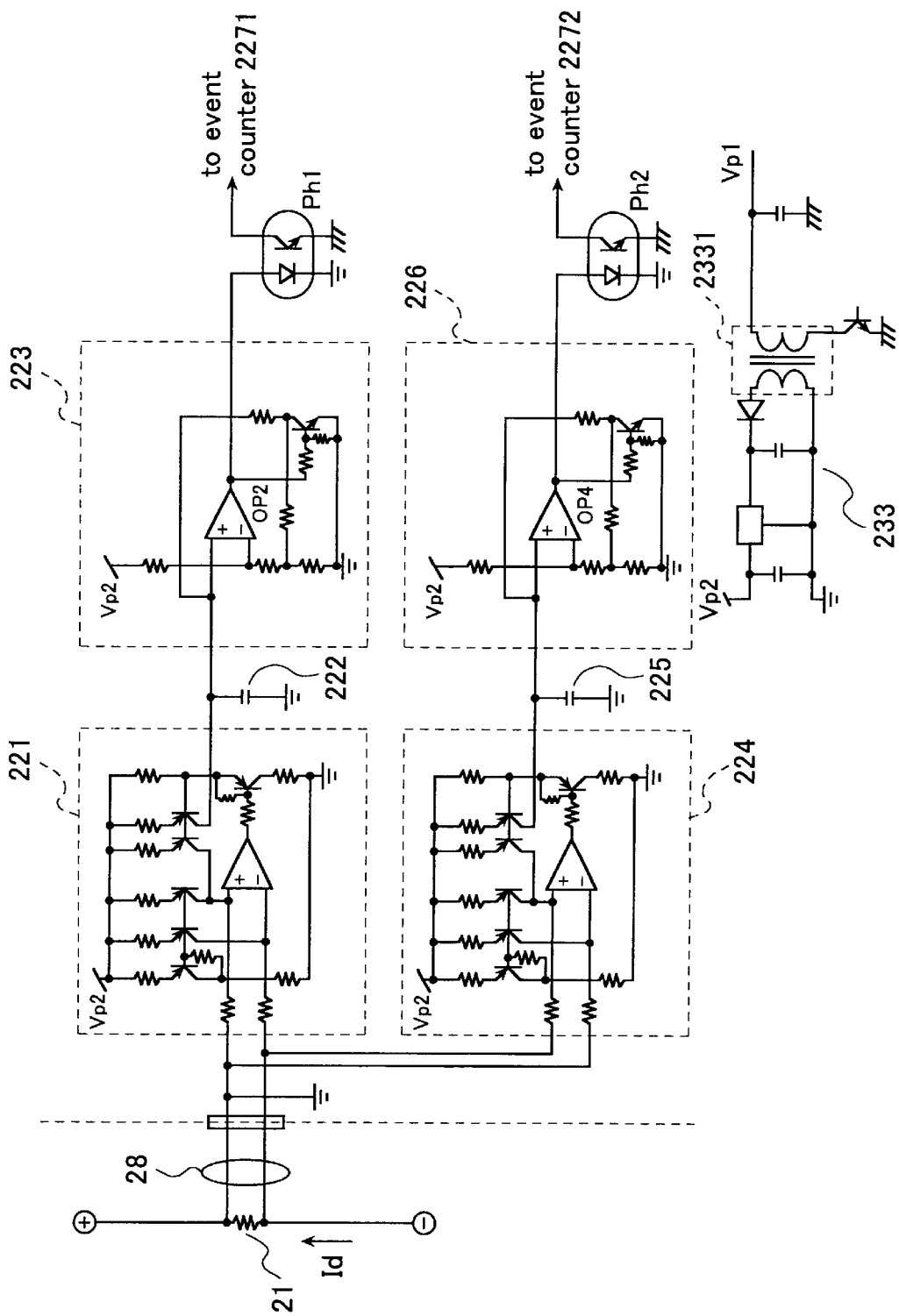
FIG. 5 is a circuit diagram showing another modified example of the configuration shown in FIG. 3.

Note here that, due to the problems of electric leakage, noises, and the like, the circuit at the side of the assembled battery 20 and the circuit at the side of an auxiliary battery that supplies electrical power to the battery ECU 22 should be isolated electrically (insulated) in some cases. In such cases, as shown in FIG. 5, the circuit at the side of the pulse generation unit during discharge 223 and the pulse generation unit during charge 226 and the circuit at the side of the event counters 2271 and 2272 within the microcomputer 227 can be isolated electrically by using photocouplers Ph1 and Ph2 with respect to signals and by using a switching transformer 2331 in a switching power source circuit 233 with respect to the power source.

The following describes the configuration of the current detection resistor 21 according to this embodiment, with reference to FIG. 6.

Figure 6A:
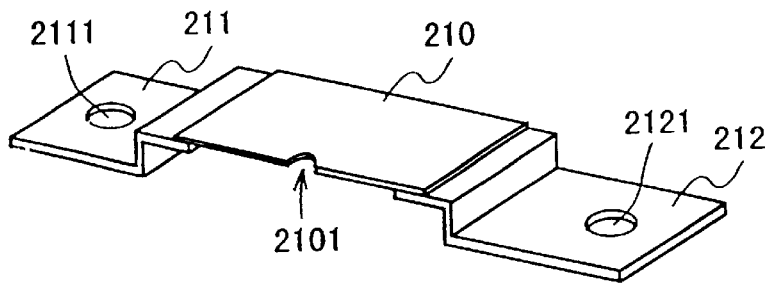
FIG. 6A is a schematic external view showing the assembly process of a current detection resistor 21.
Figure 6B:
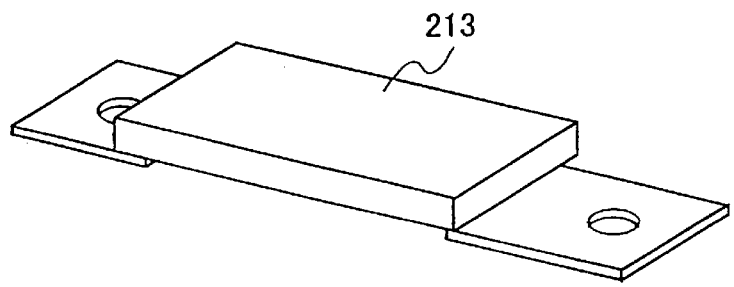
FIG. 6B is a schematic external view showing the assembly process of the current detection resistor 21.
Figure 6C:
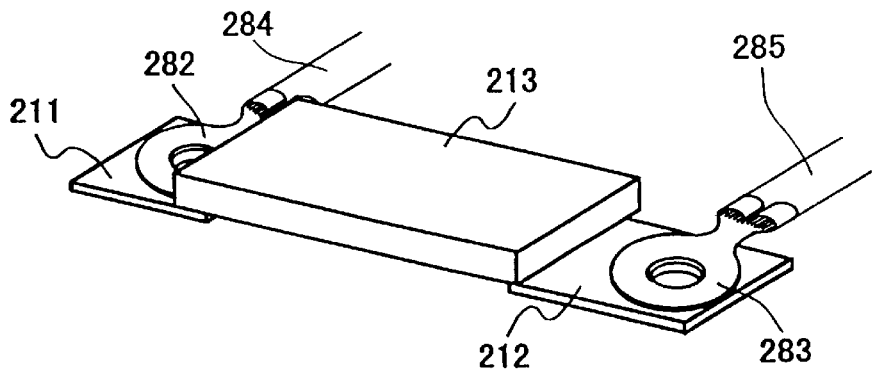
FIG. 6C is a schematic external view showing the assembly process of the current detection resistor 21.

FIGS. 6A, 6B, and 6C are schematic external views showing the assembly process of the current detection resistor 21. First, as shown in FIG. 6A, a thin alloy plate 210 subjected to a resistance value trimming by forming a notch portion 2101 is fixed and mounted onto a pair of metal plates, each of which has a mounting hole 2111 or 2121, for example by brazing. It is preferable that the alloy plate 210 is made of Cu—Mn—Ni alloy (Cu: 12%, Mn: 2%), Cu—Ni alloy (Cu: 40 to 45%), and the like, which have a high volume resistivity and a low temperature coefficient of resistance. Also, it is preferable that the pair of metal plates having the mounting holes 2111 and 2121 is a nickel plate, a nickel-plated copper plate, and the like. Next, molded resin 213 is formed so as to seal the alloy plate 210 (FIG. 6B). Finally, ring terminals 282 and 283 are crimped to ends of a pair of wiring harnesses 284 and 285, respectively, and the ring terminals 282 and 283 are spot-welded to the mounting holes 2111 and 2121 of the metal plates 211 and 212, respectively (FIG. 6C). A connector is attached to the other ends of the pair of wiring harnesses 284 and 285, whereby these wiring harnesses are connected to the battery ECU 22. As a result, a current detection resistor having a low resistance value with high precision can be realized in a simple configuration.

Figure 7A:
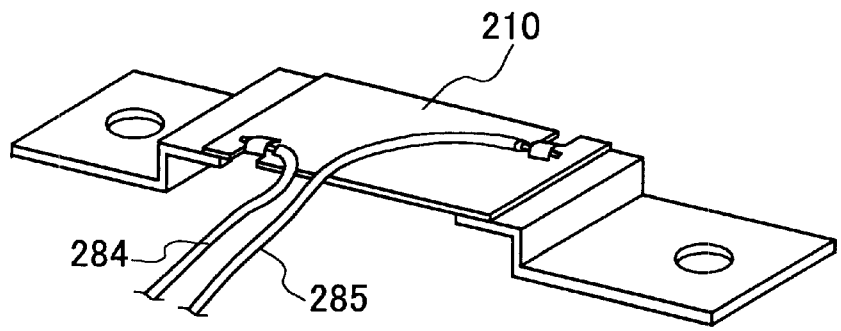
FIG. 7A is a schematic external view showing a modified example of the assembly process of the current detection resistor 21.
Figure 7B:
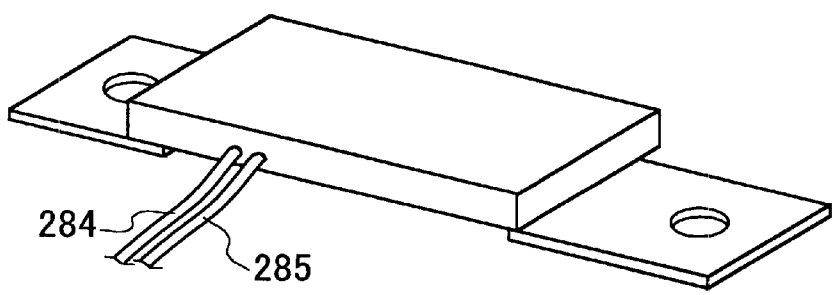
FIG. 7B is a schematic external view showing a modified example of the assembly process of the current detection resistor 21.

FIGS. 7A and 7B are schematic external views showing a modified example of the assembly process of the current detection resistor 21. As shown in FIG. 7A, wiring harnesses may be clamped and attached to the alloy plate 210 directly, and as shown in FIG. 7B, molded resin may be formed over the wiring harnesses.

In this embodiment, the current value is calculated as the counted number of pulses from the voltage generated across the current detection resistor 21 at the time of charge/discharge by the assembled battery 20 in the circuit having the above-stated configuration. However, as long as the circuit is configured as a voltage-frequency conversion circuit by which a voltage level signal can be converted into a pulse frequency signal, circuits with other configurations may be used.

In addition, in this embodiment, the event counters 2271 and 2272 included within the microcomputer 227 are used for calculating the current value as the counted number of pulses. However, as long as the means can count the number of pulses (pulse frequency), means with other configurations may be used.

As stated above, according to the present invention, a remarkable effect of realizing a battery power source device provided with a system capable of detecting a charge/discharge current flowing through a secondary battery mounted on an electric vehicle, an uninterruptible power supply system, a backup power source device, and the like, at low cost, with high reliability, and with high precision can be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A battery power source device to which electrical power is supplied from an assembled battery including a combination of a plurality of single cells or unit cells, each of which is a secondary battery, comprising:
   a current detection resistor connected to the assembled battery in series;
   transmission means for transmitting a voltage signal generated across the current detection resistor; and
   a control device separated from the assembled battery, the current detection resistor, and the transmission means, wherein the control device comprises:
      a discharge current detection unit that receives the voltage signal transmitted via the transmission means and outputs a current signal in proportion to a discharge current flowing through the current detection resistor at the time of discharge from the assembled battery;
      a first capacitor that totals current signals output from the discharge current detection unit;
      a pulse generation unit during discharge that, when a voltage of the first capacitor increases to a first threshold value, reverses an output signal and makes the first capacitor discharge, and when the voltage of the first capacitor decreases to a second threshold value, reverses the output signal again to generate a pulse and stops the first capacitor discharging;
      a charge current detection unit that receives the voltage signal transmitted via the transmission means and outputs a current signal in proportion to a charge current flowing through the current detection resistor at the time of charge of the assembled battery;
      a second capacitor that totals current signals output from the charge current detection unit;
      a pulse generation unit during charge that, when a voltage of the second capacitor increases to a third threshold value, reverses an output signal and makes the second capacitor discharge, and when the voltage of the second capacitor decreases to a fourth threshold value, reverses the output signal again to generate a pulse and stops the second capacitor discharging; and
      a current detection unit that counts the number of pulses output from the pulse generation unit during discharge and the pulse generation unit during charge and calculates a current flowing through the assembled battery at the time of discharge and charge using the counted number of pulses.

2. The battery power source device according to claim 1, wherein the current detection unit included in the control device counts in advance the number of pulses output from the pulse generation unit during discharge and the pulse generation unit during charge immediately after power-up of the battery power source device, the counted number of pulses in advance is subtracted from the number of pulses counted during operation of the battery power source device, and a current flowing through the assembled battery is calculated using a result of the subtraction.

3. The battery power source device according to claim 1, wherein each of the discharge current detection unit and the charge current detection unit further comprises:
   a differential operation circuit having a first input terminal and a second input terminal;
   a first resistor having one end connected to the first input terminal of the differential operation circuit;

a second resistor having one end connected to the second input terminal of the differential operation circuit;

a first constant current circuit having an output end connected to the first input terminal of the differential operation circuit;

a second constant circuit having an output end connected to the second input terminal of the differential operation circuit;

a first current source that operates in accordance with an output signal from the differential operation circuit and functions so that a voltage level at the first input terminal of the differential operation circuit becomes equal to a voltage level at the second input terminal; and a second current source that operates in accordance with the output signal from the differential operation circuit, has a current mirror relationship with the first current source, and outputs a current signal in proportion to a current flowing through the current detection resistor to the outside, wherein the control device further comprises:

a first switch having one end connected to the other end of the first resistor and the other end electrically connected to one end of the current detection resistor via the transmission means;

a second switch having one end connected to the other end of the second resistor and the other end electrically connected to the other end of the current detection resistor via the transmission means; and a third switch connected between the other ends of the first resistor and the second resistor.

4. The battery power source device according to claim 3, wherein the control device further comprises an offset correction unit that makes a correction to the current in accordance with a result obtained by subtracting a first counted number of pulses from a second counted number of pulses, where the first counted number of pulses is output from the pulse generation unit during discharge and the pulse generation unit during charge for a constant time period in a state where the first switch and the second switch are open and the third switch is closed during operation of the battery power source device, and the second counted number of pulses is output from the pulse generation unit during discharge and the pulse generation unit during charge in a state where the first switch and the second switch are closed and the third switch is opened during operation of the battery power source device.

5. The battery power source device according to claim 1, wherein in the control device a side of the pulse generation unit during discharge and the pulse generation unit during charge and a side of the current detection unit are isolated electrically.

6. The battery power source device according to claim 1, wherein the current detection resistor comprises:

an alloy plate subjected to a resistance value trimming;

a pair of metal plates on which both ends of the alloy plate are fixed and mounted and to which one end of the transmission means is fixed; and molded resin for sealing the alloy plate.

7. The battery power source device according to claim 1, wherein the assembled battery is configured to be separated into a plurality of blocks, the battery power source device further comprises a current control unit that controls a charge/discharge current with respect to the assembled battery; and the control device further comprises: a voltage detection unit that detects a battery voltage at each of the plurality of blocks; and a voltage comparison unit that compares battery voltages obtained from the voltage detection unit, wherein as a result of the comparison by the voltage comparison unit, if a difference in voltage is generated among the battery voltages at the plurality of blocks, the current control unit controls so as to decrease a current flowing through the current detection resistor.

\* \* \* \* \*